Nov. 2, 1965   C. C. PITTS   3,215,411
ELASTOMER TIRED WHEEL DRIVE FOR CONCRETE MIXERS
Filed Sept. 7, 1962   6 Sheets-Sheet 4
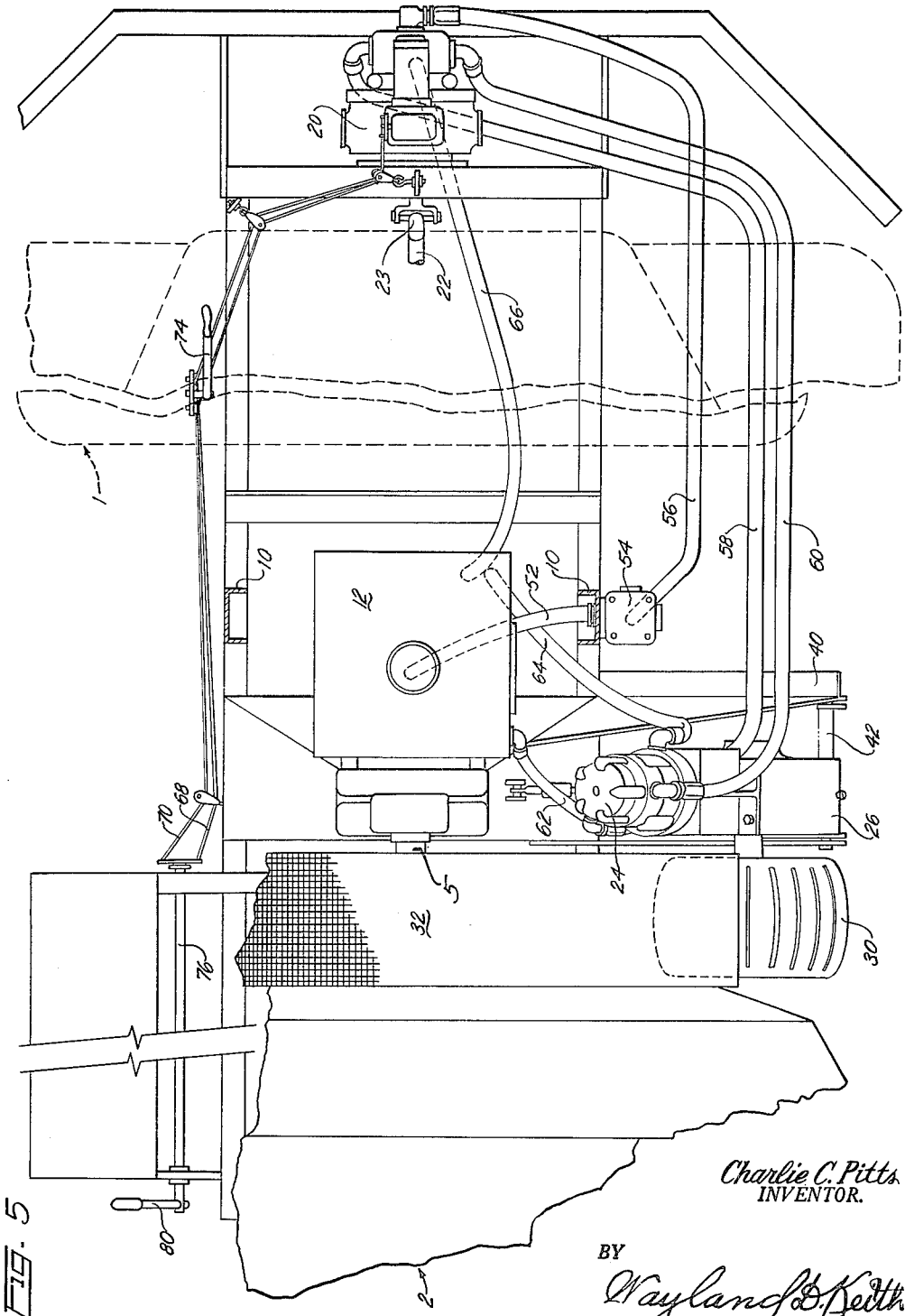

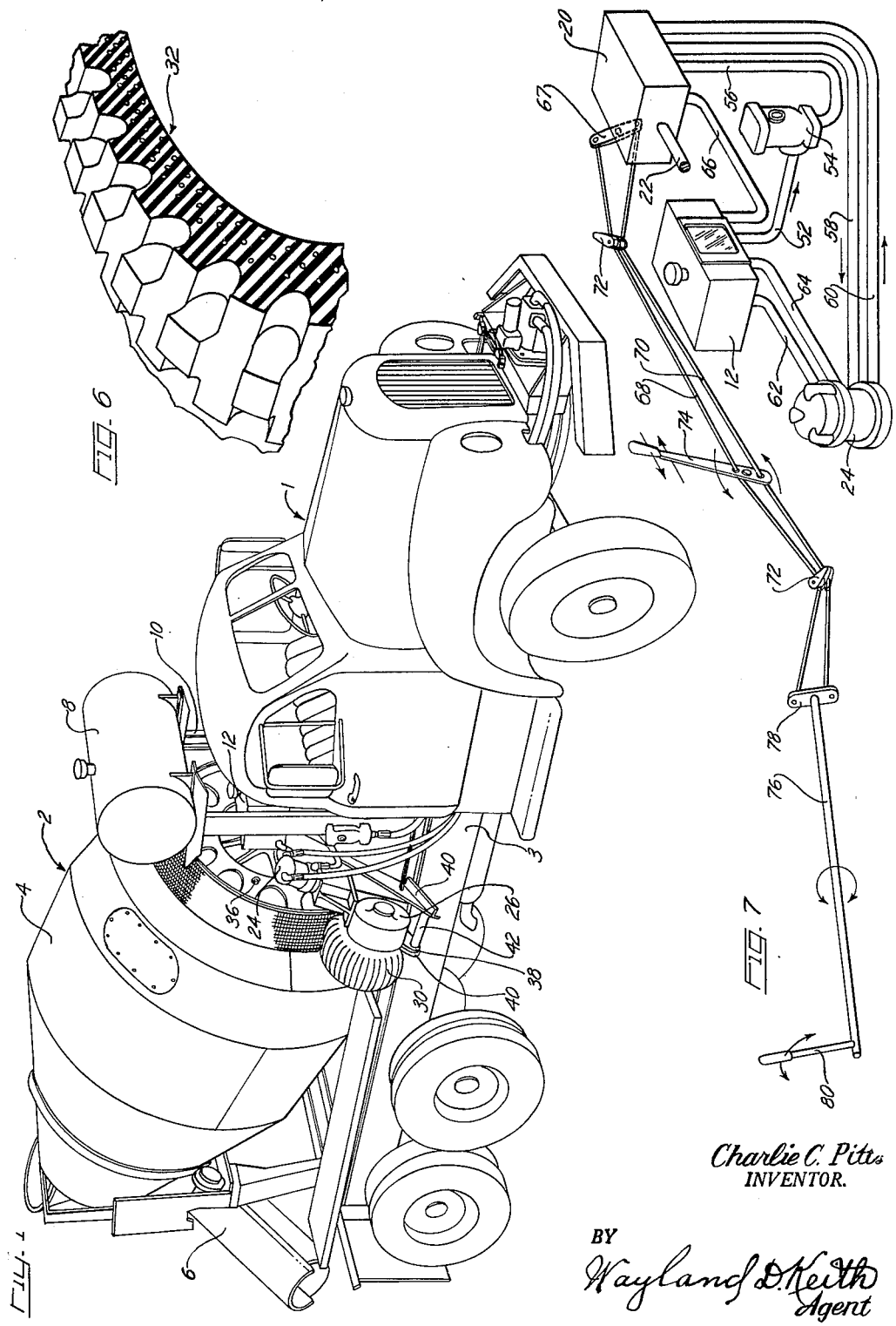

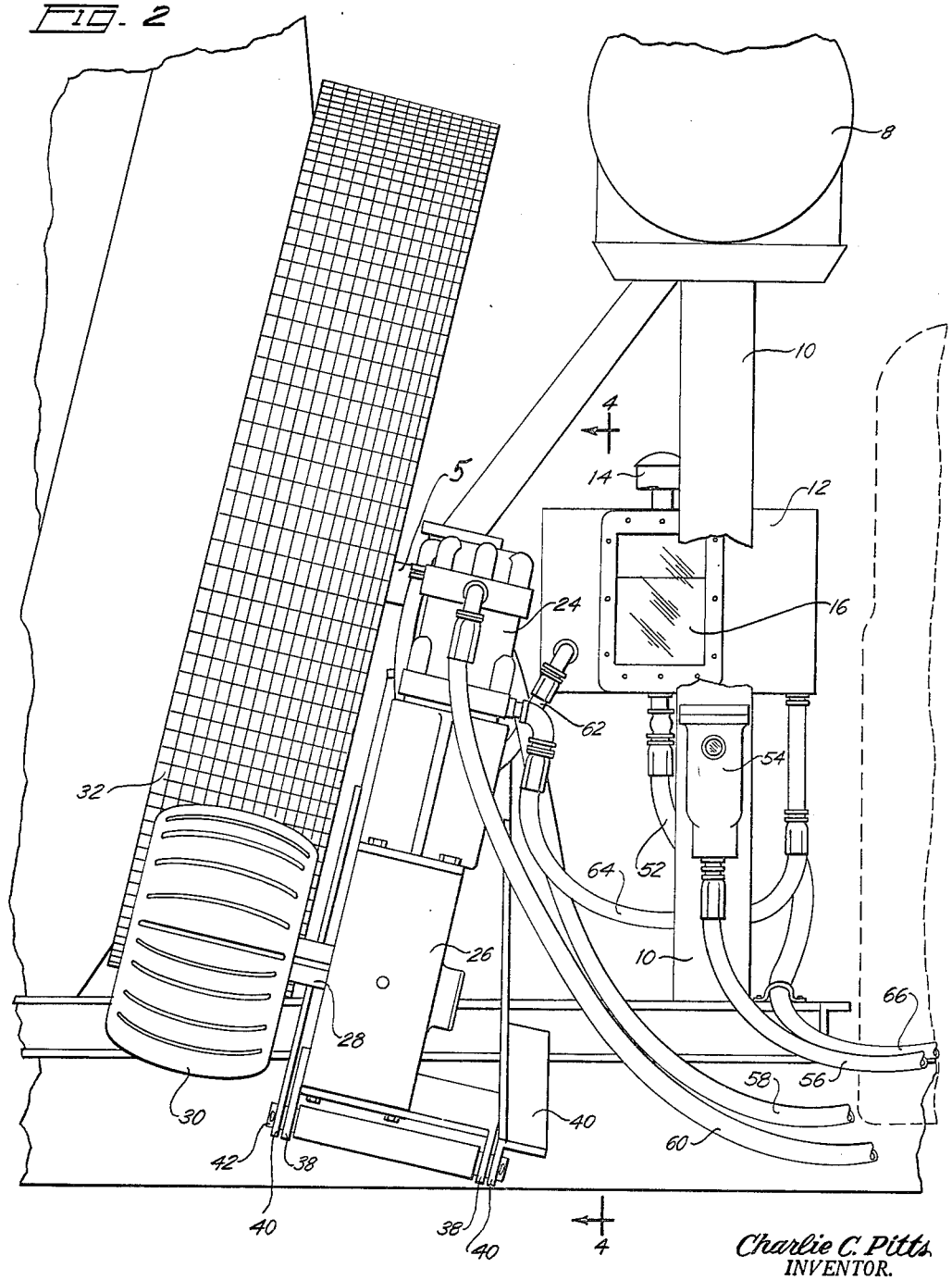

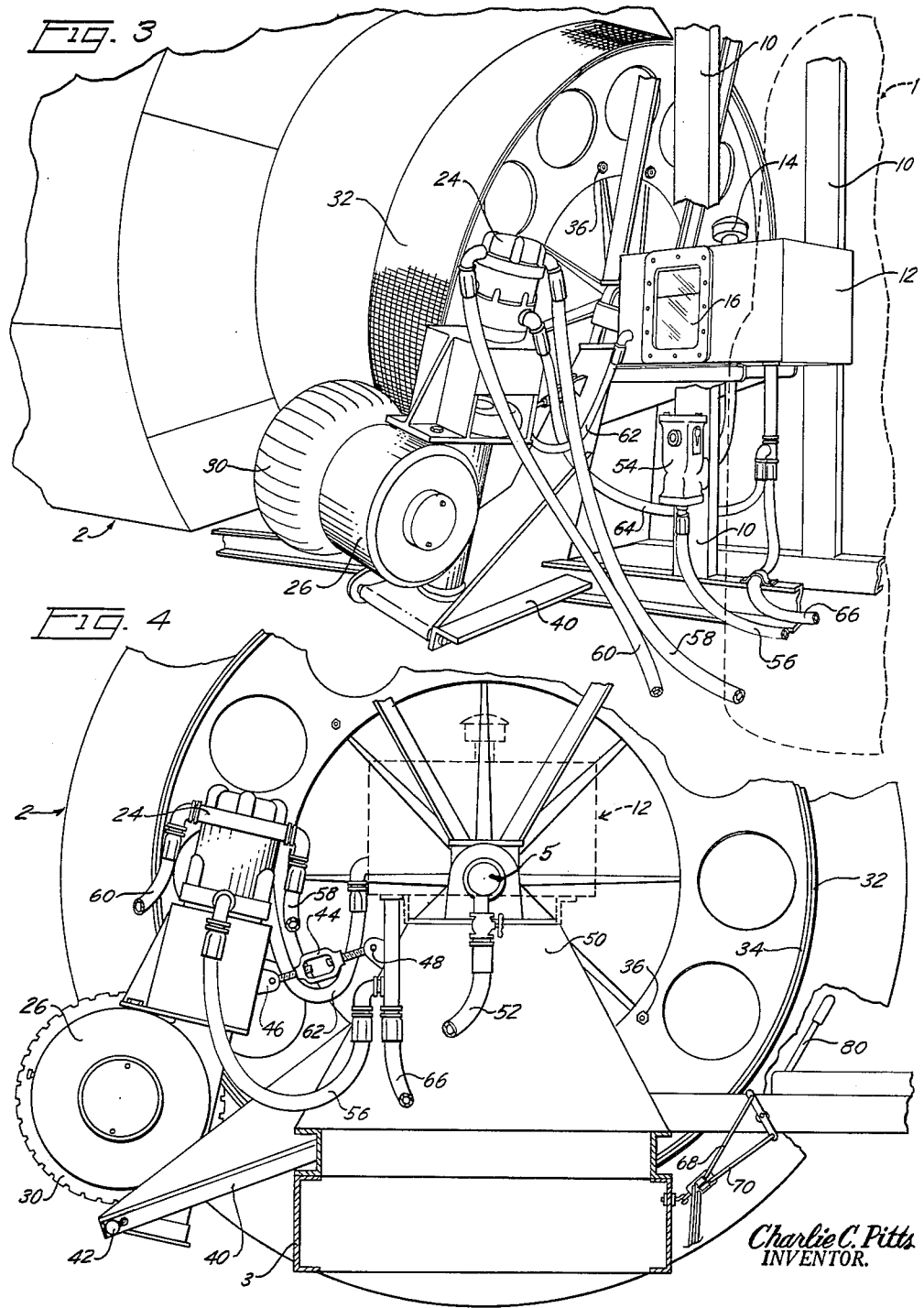

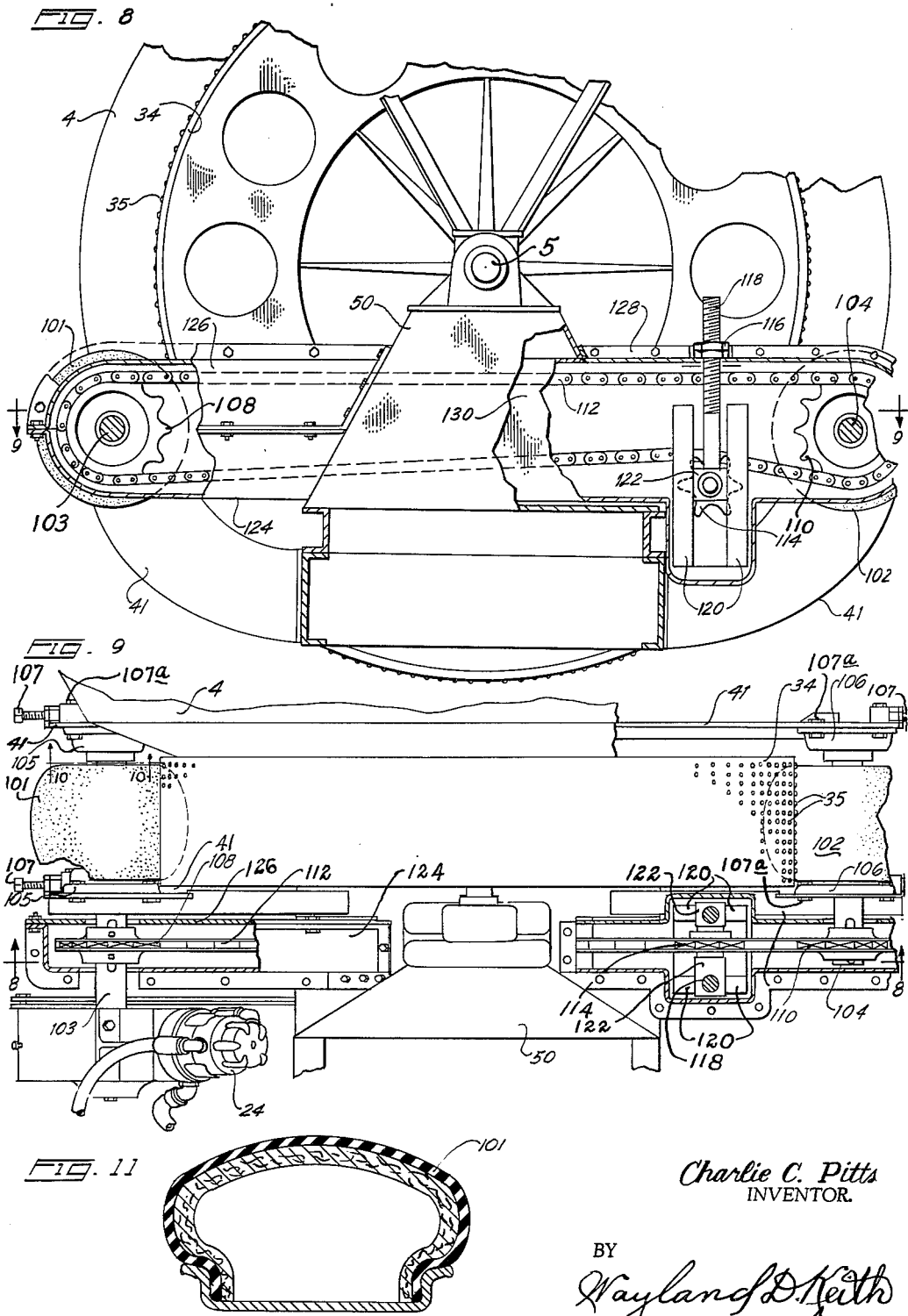

Nov. 2, 1965  C. C. PITTS  3,215,411
ELASTOMER TIRED WHEEL DRIVE FOR CONCRETE MIXERS
Filed Sept. 7, 1962  6 Sheets-Sheet 6
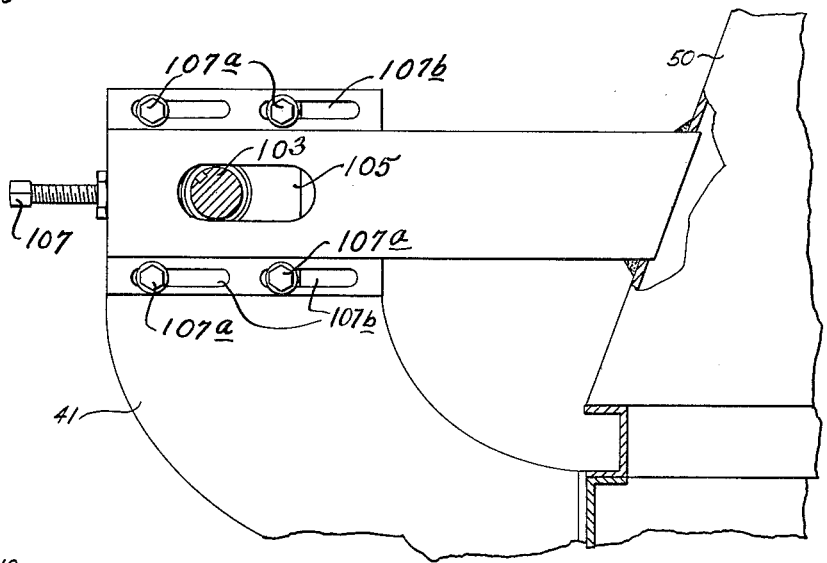
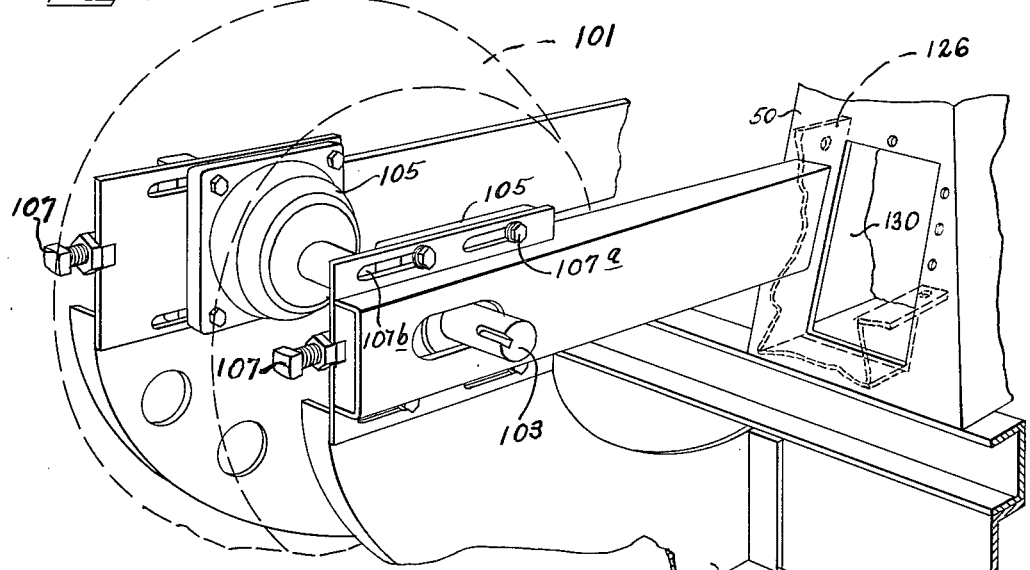
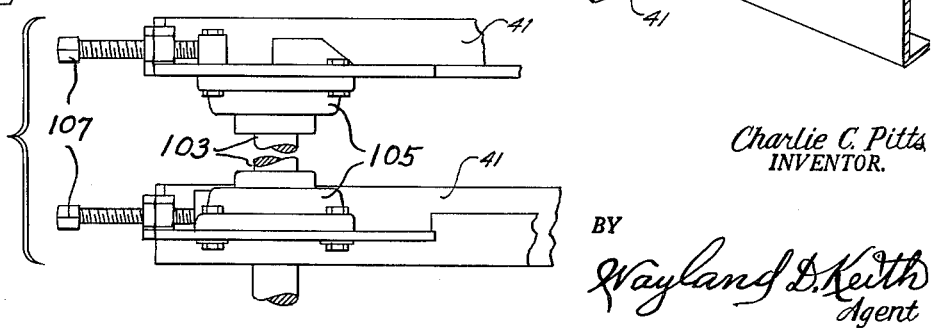
Charlie C. Pitts
INVENTOR.
BY
Wayland D. Keith
Agent

United States Patent Office 3,215,411
Patented Nov. 2, 1965

3,215,411
ELASTOMER TIRED WHEEL DRIVE FOR CONCRETE MIXERS
Charlie C. Pitts, P.O. Box 2485, Wichita Falls, Tex.
Filed Sept. 7, 1962, Ser. No. 222,064
1 Claim. (Cl. 259—177)

This invention relates to improvements in concrete mixers and more particularly to drives for concrete mixers to enable the mixer to be readily turned in either direction from zero to the maximum speed without the necessity of shifting gears.

Various drives have been proposed heretofore, but these, for the most part, utilized chains and gears together with the gear shift mechanism, which made the upkeep expensive and time consuming because of gear stripping and gear wear due to the fact that the gears and chains are exposed to the abrasive elements such as sand, rock, grit, and the like which is ever present around concrete mixers, especially concrete mixers which are truck mounted.

The present device utilizes an elastomer tired wheel or wheels, for the final drive, which may be pneumatically inflated if desired, the peripheral face thereof being in frictional engagement with a cylindrical friction surface to rotate the drum of the concrete mixer. Furthermore, the power source for driving the elastomer tired wheel or wheels is a hydraulic motor which is reversible so it may be readily driven from zero to the maximum speed of rotation, in either direction, thereby enabling the concrete mixer drum to be rotated at a uniform rate of speed while moving from the plant to the place where the concrete, within the truck mounted mixer, is to be used. The rotation of the concrete mixed drum with the present drive may be maintained at approximately constant speed regardless of the speed of the motor of the truck.

Various drives for truck mounted concrete mixers have been proposed heretofore, but these for the most part embody heavy, open meshed gears which wear rapidly when exposed to the abrasive action of sand, rock, grit, and the like, and which is expensive to replace.

The wearing parts of the present mechanism, with the exception of the elastomer tired wheel or wheels and the cylindrical friction surface, are housed in such manner that the dust and sand are excluded from the working parts of the machinery.

An object of this invention is to provide a drive for a concrete mixer which will rotate the drum of the concrete mixer smoothly and without metallic meshing gears or chain being exposed to the abrasive materials found around concrete mixing operations.

Another object of the invention is to provide an elastomer tired wheel for interengagement with a friction surface on the concrete mixer drum, so as to roll the concrete mixer drum in either direction at a predetermined speed.

Another object of the invention is to provide a hydraulically actuated drive for driving a concrete mixer drum which may be readily adjusted to drive the concrete mixer drum in either direction from zero to the maximum revolutions without having to shift gears.

Another object of the invention is to provide an attachment for truck mounted concrete mixer drums whereby a cylindrical drum with a friction surface thereon may be attached to a concrete mixer drum in such manner that an elastomer tired wheel may be brought into driving engagement therewith, so upon rotation of the elastomer tired wheel, the concrete mixer drum will be rotated.

And still a further object of the invention is to provide a drive for a concrete mixer drum which is simple in construction, easy to install and remove, relatively light in weight and low in the cost of manufacture, which will drive a concrete mixer drum at a predetermined speed in either direction.

With these objects in mind and others which will become manifest as the description proceeds, reference is to be had to the accompanying drawings in which:

FIG. 1 is a perspective view of a truck mounted concrete mixer utilizing the apparatus embodied herein;

FIG. 2 is an enlarged elevational, fragmentary view of the drive for the concrete mixer drum with a portion of the truck being shown in dashed outline, with the drive and a portion of the concrete mixer drum being shown in full outline;

FIG. 3 is an enlarged fragmentary, perspective view of the drive mechanism;

FIG. 4 is a fragmentary view taken on line 4—4 of FIG. 2 looking in the direction indicated by the arrows;

FIG. 5 is an enlarged fragmentary, top plan view of the drive for a concrete mixer drum, with parts broken away, other parts shortened, and showing the control device for controlling the operation of the device, and also showing a hydraulic pump and conduit system connected thereto;

FIG. 6 is a fragmentary, perspective view of a portion of the friction material used on the cylindrical member to provide for the elastomer tired wheel the maximum of driving friction between the drive and driven elements;

FIG. 7 is a perspective schematic view of the control mechanism and the conduit system between the pump and the motor, and showing storage tank and a filter within the system;

FIG. 8 is a fragmentary sectional view taken on line 8—8 of FIG. 9 looking in the direction indicated by the arrows, with parts being broken away, and showing a section to bring out the details of construction;

FIG. 9 is a fragmentary top plan view with parts being broken away and shown in section to bring out the details of construction;

FIG. 10 is a fragmentary sectional view taken on line 10—10 of FIG. 9;

FIG. 11 is a fragmentary sectional view of the pneumatically tired drive wheels;

FIG. 12 is a fragmentary, perspective view showing the bearings mounted on the bearing support brackets, with one of the friction roller drive members being shown in dashed outline, with parts being broken away and with parts being shown in section to bring out the details of construction; and FIG. 13 is a fragmentary top plan view of the bearings mounted on the bearing support brackets showing the adjustment means therefor, with the shaft thereof where the friction roller drive member would normally be, broken away and shortened, and with parts being shown in section to bring out the details of construction.

With more detailed reference to the drawings the numeral 1 generally designates a vehicle such as a motor truck upon which is mounted a concrete mixer designated generally by the numeral 2. The drum of the concrete mixer is designated by the numeral 4, the interior of which drum is of conventional design, which, when rotated in one direction, gives a mixing action to sand, cement, and aggregate therein to mix these materials into a plastic mass, and when rotated in the opposite direction, will discharge the plastic mass of concrete out at the rear end thereof and into a chute 6, which chute may be connected to the discharge of the mixer to form a trough-type gravity conveyer to the point of use. A water reservoir is shown at 8, which is supported on upright standard 10 in the conventional manner. The present device has a hydraulic fluid supply tank 12 positioned on the truck rearwardly of the cab thereof, which tank has a combinaiton fill cap and air filter 14 thereon. A transparent sight glass 16 is provided in a side thereof to permit inspection of the hydraulic fluid within the tank.

A hydraulic hose 66 is connected to the lower side of the tank 12 and to a hydraulic pump 20 which is mounted on the forward end of the truck. The pump 20 is connected in driven relation to the truck 1 by a shaft 22. The shaft 22 is connected to the engine of the truck, which shaft has a universal joint 23 thereon, as will best be seen in FIG. 5. The hydraulic pump is of the character which has hydraulic valving built thereinto to regulate the output of the pump which valving is contained within the assembly (which unit is of a conventional design) so that the hydraulic fluid may be directed selectively into a conduit to drive the motor 24 in one direction, or the fluid may be withdrawn from that conduit and directed into another conduit so as to drive a hydraulic motor 24 in the opposite direction.

The hydraulic motor 24 has a multiplicity of hose connected thereto, in this instance to receive the fluid in one direction and, to discharge fluid in the opposite direction, so that the motor may be driven from zero to maximum speed in either direction, which motor is of conventional design. The motor drives through a gearing within mixer drive unit 26 to rotate shaft 28, on which shaft 28 an elastomer tired wheel 30 is mounted. The reduction through the gearing within the casing of mixer drive unit 26 is such as to enable the shaft 28 to be driven from zero to the maximum speed in either direction. The drive unit further receives an additional reduction gearing by a relatively small diameter, elastomer tired wheel 30 being maintained in driving relation with a relatively large cylindrical member 34 having a friction surface material 32 thereon.

The cylindrical member 34 is attached to the end of the concrete mixer drum 4 by bolts 36, as will best be seen in FIG. 4. The friction surface material 32, as will best be seen in FIG. 6, is preferaby a ribbed rubber material, with the primary ribs running parallel to the axis of the rotation of the cylindrical member 34, so that the elastomer tired wheel 30, which also has ribs thereon, which ribs are parallel to the rotational axis thereof, form a friction drive which readily rotates the concrete mixer drum in either direction. The friction surface material 32 may be secured to the cylindrical member 34 as by bonding, by rivets, the combination of both, or by other suitable means.

The mixer drive unit 26, as will best be seen in FIGS. 2, 3, and 4, has lugs 38 thereon which lugs have apertures formed therein. Apertured lugs 40 are mounted on the frame 3 of the truck 1 so that the apertures therein will register with the apertures in the lugs 38 on the gear casing of mixer drive unit 26 so a pin 42 may be passed through the respective aligned apertures so as to pivotally mount the hydraulic motor 24, gear casing of mixer drive unit 26, and elastomer tired wheel 30 for swinging movement about the axis thereof so that the elastomer tired wheel 30 may be drawn into binding engagement with the friction surface material 32 on cylindrical member 34, by a turnbuckle 44 mounted between a lug 46 on the gear casing of mixer drive unit 26 and a lug 48 on bearing support member 50 which turnbuckle is secured to said lugs. The turnbuckle 44 enables the elastomer tired wheel 30 to be drawn inward against the friction surface 32 of cylindrical member 34 to give the desired degree of frictional contact.

This particular hydraulic system utilizes four conduits, however it is to be understood that the hydraulic units per se are conventional.

The present hydraulic unit utilizes a hose 52 which leads from the bottom of hydraulic fluid reservoir 12, which conduit leads through a filter 54, thence into conduit 56 and into pump 20. Hose 58 and 60 lead from the hydraulic pump 20 to the hydraulically actuated motor 24. Exhaust and bleed lines 62 and 64 lead from the hydraulic motor 24 to the reservoir 12. A further bleed line 66 leads from hydraulic pump 20 to the reservoir, as will best be seen in FIG. 7. The hydraulic pump has a double swing control lever 67 pivotally mounted on a valve regulator shaft, which lever 67 is apertured near the respective ends to receive control cables 68 and 70, respectively. The cables 68 and 70 are guided through sheave pulleys 72 so that the cables will be and are intercepted in aligned relation with a lever 74 within the cab of vehicle 1. The cables 68 and 70 are connected to the lever 74 in such manner that upon rocking the lever back and forth the lever 67 will be moved in synchronized relation therewith. The cables 68 and 70 extend to a point on the frame of the unit to where a rod 76 is mounted. The rod 76 has a double end lever 78 secured thereon, opposite ends of which are apertured to receive the respective cables 68 and 70 therein so as to rock the lever about the axis of rod 76. A further hand control lever 80 is secured to the rod 76 and positioned near the rear end of the truck so that the operator may control the rotation either from the cab of the truck or from the rear of the truck.

*Preferred form of invention*

With more detailed reference to the preferred form of the invention, the concrete mixer drum 4 is of the same construction as the form shown in FIGS. 1 through 7 and has an outstanding cylindrical driven member 34, which, in the present instance, has a rough surface 35 to enable greater friction between the drive and driven elements.

The present unit embodies a hydraulic actuated motor 24 which is driven in the manner as set out in the above mentioned form of invention.

The present device utilizes a pair of friction roller drive members 101 and 102 which have the respective shafts 103 and 104 fixedly secured thereto, each of which shafts is journaled in pairs of bearings 105 and 106 respectively. These bearings maintain the shafts 103 and 104 in parallel relation and are adjustable to enable the friction roller drive members to be brought into driving contact with the cylindrical member 34.

The shaft 103 is connected in driving relation with hydraulic drive motor 24, which shaft has a drive sprocket 108 fixedly secured thereto for rotation therewith. The shaft 104 has a sprocket 110 fixedly secured thereto for rotation therewith to rotate friction roller drive member 102. The bearings 105 and 106 are mounted on bearing support brackets 41, which support brackets are slotted as indicated in FIG. 10 so that the friction roller drive members 101 and 102 may be adjusted with respect to cylindrical member 34 so as to give the amount of friction necessary to drive mixing drum 4. With each of the drive members 101 and 102 in the correct frictional contact relation with the cylindrical member 34, the device is ready to be driven. Chain 112 surrounds sprockets 108 and 110 and passes above idler sprocket 114 and the idler sprocket is moved upward by nuts 116 to tighten the chain 112 to the desired degree to hold screw 118 in adjusted relation. Pairs of upright bars 120 maintain bearings 122 in parallel sliding relation, as will best be seen in FIGS. 8 and 9.

By having two friction roller drive members in contact engagement with cylindrical member 34, greater friction can be applied thereto, which enables the handling of larger loads than is possible to handle with the form of the device shown in FIGS. 1 through 7.

Due to the highly abrasive action of concrete aggregate, the sprockets 108 and 110, chain 112 and sprocket 114 have been encased in housing 124. It is preferable to have the housing 124 made in sections with the section 126 abutting with one face of upright support standard 50 and section 128 abutting with the other face of upright support standard 50, which upright support standard has an oil tight tunnel portion 130 passing therethrough. The removal of sections 126 and 128 gives access to the chains and gears for replacement and repair.

The hydraulic drive and the manipulation of the preferred form of the device is substantially the same as for the form as set forth in FIGS. 1 through 7. Friction roller drive members 101 and 102, in the form of the invention as shown in FIGS. 8 through 11, preferably are pneumatically tired with relatively wide faced friction treads, which pneumatic tires may be inflated to the desired pressure to perform the desired friction on the driven member.

The pairs of bearings 105 and 106 are movably mounted on the respective bearing support brackets 41 so that the shafts 103 and 104, which carry friction roller drive members 101 and 102, may be urged inward by jack screws 107. The jack screws 107 urge the respective pairs of bearings, which carry friction roller drive members 101 and 102, inward against cylindrical member 34. When the respective friction roller drive members are sufficiently engaged with the cylindrical member 34, bolts 107a are tightened to hold the respective bolts in fixed relation within slots 107b. With both friction roller drive members 101 and 102 having the same diameter, the chain 112, which is connected in driving relation with the friction roller drive members 101 and 102, is able to apply driving pressure uniformly to the cylindrical member 34. Since the concrete mixer drum is journaled on a shaft 5, the concrete mixer drum is prevented from being lifted, regardless of the amount of pressure applied by jack screws 107.

A friction roller drive member, as shown in FIGS. 8 through 11, is shown to be pneumatically tired, as will best be seen in FIG. 11. The pneumatic tires are preferably constructed of an elastomer having heat resisting qualities.

Having thus clearly shown and described the invention, what is claimed as new and desired to be secured by Letters Patent is:

A drive for a concrete mixer, including a frame, comprising
(a) a hydraulic pump,
(b) power means connected in driving relation with said hydraulic pump,
(c) a hydraulic motor, mounted on the frame of the concrete mixer, and having an outwardly extending shaft,
(d) a hydraulic fluid reservoir,
(e) a conduit connecting said reservoir and said hydraulic pump in fluid communication, and a pair of conduits connecting said hydraulic pump and said hydraulic motor in fluid communication,
(f) conduit means connecting said hydraulic motor and said hydraulic fluid reservoir,
(g) control valves in said conduits intermediate said hydraulic pump and said hydraulic motor to control the flow of fluid to rotate the hydraulic motor in either direction,
(h) remote control means connected to said control valves to selectively rotate said hydraulic motor in either direction,
(i) bearing mounting means mounted on the frame of said concrete mixer,
  (1) a bearing mounted on each said bearing means,
(j) a cylindrical mixer drum mounted on the frame in journaled relation,
(k) a first shaft journaled in said bearings and being substantially parallel to the axis of the concrete mixer drum and being in driving relation with the shaft of said hydraulic motor,
(l) a first concentric friction member mounted on and secured to said first shaft,
(m) a flat faced, cylindrical flange secured to an end of said cylindrical mixer drum, coaxially thereof, and being engageable with said first concentric friction member in driven relation,
(n) a second shaft mounted on the frame in journaled relation, on the opposite side of said flat faced, cylindrical flange from said first shaft, and being parallel thereto,
(o) a second concentric friction member mounted on said second shaft and being fixedly secured thereto,
(p) a power transmission wheel mounted on and secured to each shaft on which the respective concentric friction members are mounted,
(q) endless transmission means surrounding said power transmission wheels in driving relation to connect said power transmission wheels for unitary driving relation with said hydraulic motor,
(r) screw threaded adjusting means mounted on the frame of the concrete mixer adjacent each said bearing mounting said first shaft to which said hydraulic motor is connected in driving relation, to adjust the bearings independently, to adjust said first shaft and said first concentric friction member with respect to said flat faced cylindrical flange, and
(s) further screw threaded adjusting means mounted on the frame of the concrete mixer on the side adjacent said second shaft to adjust each bearing, mounting said second shaft, independently to move said second shaft and said second concentric friction member relative to the other side of said flat faced, cylindrical flange.

References Cited by the Examiner

UNITED STATES PATENTS

| | | | |
|---|---|---|---|
| 1,456,121 | 5/23 | Crandell | 74—212 |
| 1,725,681 | 8/29 | St. John | 259—177 X |
| 1,943,325 | 1/34 | Knowles | 259—171 |
| 2,284,548 | 5/42 | Wood | 308—204 X |
| 2,492,895 | 12/49 | Schulz | 259—177 |
| 2,573,103 | 10/51 | Kling | 68—144 |
| 2,676,003 | 4/54 | Oury | 259—177 |
| 2,985,027 | 5/61 | Murray | 74—242.14 X |
| 3,016,232 | 1/62 | Domenighetti | 259—177 |
| 3,033,057 | 5/62 | Gray | 259—157 X |

WALTER A. SCHEEL, *Primary Examiner.*
CHARLES A. WILLMUTH, *Examiner.*